United States Patent
Needham

[11] 3,778,117
[45] Dec. 11, 1973

[54] SIMPLIFIED ADAPTIVE BRAKING LOGIC

[75] Inventor: James M. Needham, South Bend, Ind.

[73] Assignee: The Bendix Corporation, South Bend, Ind.

[22] Filed: Feb. 22, 1972

[21] Appl. No.: 227,748

[52] U.S. Cl. .......................... 303/21 CG, 188/181 A
[51] Int. Cl. .............................................. B60t 8/12
[58] Field of Search ................... 188/181 A; 303/20, 303/21; 324/162; 340/52 R, 262

[56] References Cited
UNITED STATES PATENTS

| | | | |
|---|---|---|---|
| 3,606,490 | 9/1971 | Ando | 303/21 CG UX |
| 3,622,977 | 11/1971 | Wakamatsu et al. | 303/21 CG X |
| 3,652,133 | 3/1972 | Yamazaki et al. | 303/21 CG |
| 3,690,735 | 9/1972 | Arai et al. | 303/21 P |
| 3,545,819 | 12/1970 | Gaffney et al. | 303/20 X |
| 3,697,139 | 10/1972 | Elliott et al. | 303/20 X |

*Primary Examiner*—Trygve M. Blix
*Assistant Examiner*—Stephen G. Kunin
*Attorney*—Ken C. Decker et al.

[57] ABSTRACT

An adaptive braking system for a wheeled vehicle is described which includes the usual control circuitry which senses an incipient skidding condition in a corresponding vehicle wheel and which then actuates a modulator to relieve braking pressure in the corresponding brake. The control circuitry includes a comparator which actuates the modulator and a timer circuit when wheel deceleration reaches a predetermined reference level. The timer circuit produces a signal for a predetermined time period after its initial actuation. The signal from the timer switches the reference level of the comparator and also inhibits the output of the latter after termination of the comparator output within the predetermined time period.

10 Claims, 2 Drawing Figures

PATENTED DEC 11 1973          3,778,117

SIMPLIFIED ADAPTIVE BRAKING LOGIC

BACKGROUND OF THE INVENTION

This invention relates to a control circuit for a vehicle adaptive braking system.

Existing automotive adaptive braking systems utilize rather sophisticated mechanical and electronic components. For this reason, adaptive braking systems have heretofore been rather expensive, and consequently, have not been widely used. To make adaptive braking systems practical on a wide range of vehicles, their complexity must be reduced. Since the electronic control circuitry accounts for a relatively high percentage of the cost of an adaptive braking system, it is desirable to reduce the complexity of existing control circuitry so that the price of the entire system may be reduced. However, reduction of the complexity of the control circuitry has heretofore required unacceptable sacrifices in adaptive braking system performance.

SUMMARY OF THE INVENTION

Therefore, an important object of my invention is to reduce the cost and complexity of electronic control circuitry suitable for use in an automotive adaptive braking system.

Another important object of my invention is to simplify the electronic circuitry of an adaptive braking system while requiring only minimal performance sacrifices.

Another important object of my invention is to use a single timer circuit to both switch the reference level of the comparator used in the circuit and to control the operation of the inhibit circuitry which prevents further actuation of the modulator during a predetermined time period after initial actuation of the latter.

Still another important object of my invention is to eliminate complex and costly memory circuits used in existing adaptive braking systems.

DETAILED DESCRIPTION

Figure 1:
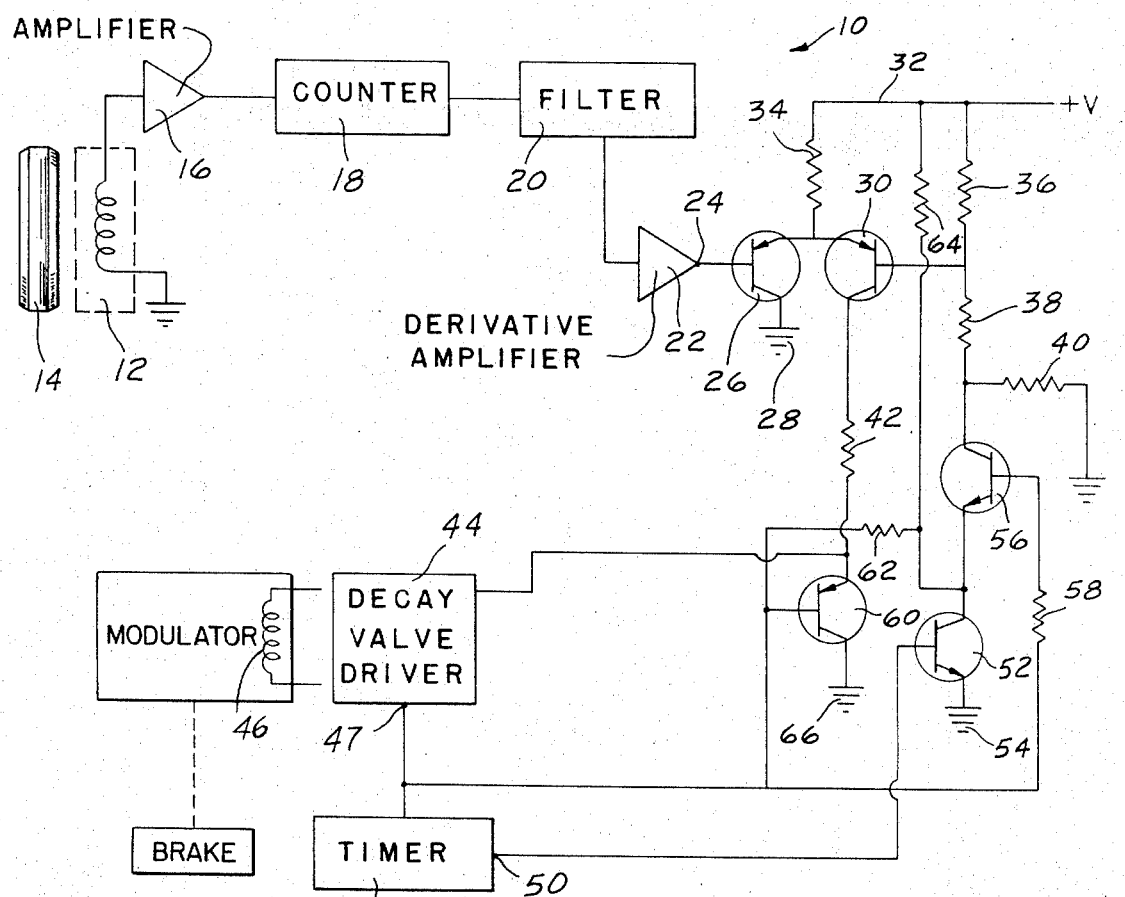
FIG. 1 is a schematic illustration of an electronic control circuit made pursuant to the teachings of my present invention.

Referring now to the drawings, an adaptive braking system generally indicated by the numeral 10 includes a conventional wheel speed sensor 12 of the electromagnetic type which produces a pulsed output, the frequency of the pulsed output increasing and decreasing as the speed of a controlled wheel 14 increases and decreases. The pulsating signals produced by the speed sensor 12 are amplified by amplifier 16, and the amplified pulses are counted by a conventional counter circuit 18. The counter 18 produces an output waveform, the magnitude of which varies as the speed of the controlled wheel 14 varies. The waveform produced by the counter 18 is processed by a conventional filter 20, and then is differentiated by derivative amplifier 22. Therefore, the signal produced at terminal 24 of amplifier 22 is proportional to acceleration and deceleration of the controlled wheel 14. The derivative amplifier 22 also inverts the acceleration signal, such that a negative acceleration or deceleration will be represented as a positive voltage at terminal 24 while a positive acceleration will be represented by a negative voltage at terminal 24.

Terminal 24 of amplifier 22 is connected to the base of a transistor 26, the collector of which is connected to an electrical ground as at 28, and the emitter of which is connected to the emitter of a second transistor 30 and also to supply line 32 through resistor 34. The supply line is maintained at a substantially constant voltage by a power supply (not shown). Resistors 36, 38 and 40 are connected between the supply line and ground, and cooperate with one another to define a voltage dividing network maintaining the base of transistor 30, which is connected between the resistors 36 and 38, at a predetermined voltage level. The collector of transistor 30 is connected through resistor 42 to the input terminal of a conventional solenoid valve driving circuit generally indicated by the numeral 44. The valve driver 44 is adapted to actuate a solenoid valve 46 for as long as a voltage signal is transmitted to the input terminal of the valve driver 44. The solenoid valve 46 is a part of an adaptive braking modulator 68, which decays braking pressure communicated to the brake 70 controlling the wheel 14 as long as the solenoid is actuated. After the decay cycle is terminated, the modulator again permits braking pressure to increase in the controlled brake. The modulator is preferably made pursuant to the teachings of U.S. Pat. No. 3,499,689, owned by the assignee of the present invention and incorporated herein by reference.

Decay valve driver 44 is further provided with an output terminal 47 which is maintained at a relatively high voltage level as long as the decay valve driver is turned on, but which drops to a low voltage level when the decay valve driver 44 turns off. The input terminal of a timer circuit 48, of conventional contruction, is connected to the terminal 47. Timer circuit 48 is responsive to initial actuation of the decay valve driver 44 to produce a signal at the output terminal 50 of the timer 48 for a predetermined time period after initial actuation of the decay valve driver 44. The output terminal 50 is connected to the base of an NPN transistor 52, the emitter of which is grounded as at 54. The collector of transistor 52 is connected to the emitter of another NPN transistor 56, the collector of which is connected between the resistors 38 and 40. The base of transistor 56 is connected to the output terminal 47 of valve driver 44 through a resistor 58. The base of a PNP transistor 60 is connected to the output terminal 47 of valve driver 44, to the power supply line 32 through resistor 62 and 64, and to the collector of transistor 52. The collector of transistor 60 is connected to ground as at 66.

MODE OF OPERATION

Figure 2:
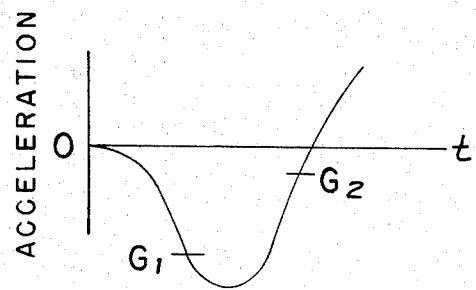
FIG. 2 is a graphical illustration of the acceleration and deceleration of a wheel controlled by the circuit illustrated in FIG. 1 during a brake actuation.

Referring now to FIG. 2, and assuming a brake application is initiated by the vehicle operator at a time $t=0$, the controlled wheel will decelerate as indicated in FIG. 2. As the magnitude of the wheel deceleration increases, the voltage level at the terminal 24 of amplifier 22, and therefore the bias on the base of transistor 26, also increases. Initially, all signals to the decay valve driver 44 are suppressed, since transistor 26 is turned on and transistor 30 is turned off. However, when the magnitude of the wheel deceleration increases to such an extent that the bias on the base of transistor 26 equals or exceeds the bias on the base of transistor 30, which is a known constant determined by the valves of resistors 36, 38, and 40, transistor 26 turns off and transistor 30 turns on, thereby transmitting a signal actuating the decay valve driver 44. This value of the deceleration of the wheel 14 is represented by point $G_1$ on FIG. 2.

After the wheel decelerates to the $G_1$ level thereby actuating the modulator, the wheel 14 begins to accelerate after a brief additional deceleration due to time lags in the system. As the wheel accelerates past the $G_1$ level, the solenoid valve would normally be turned off. However, experiments have indicated that, once a pressure decay has been initiated, it is desirable to continue to decay pressure to permit the wheel to accelerate past the $G_1$ level until a lower deceleration is attained, as represented by $G_2$ in FIG. 2, if the $G_2$ deceleration level is attained within a relatively short time period after the $G_1$ deceleration is attained. For this reason, transistors 54 and 56 are included in the circuit to change the bias on the base of transistor 30, which with the transistor 26 defines the comparator circuit. Since transistors 54 and 56 are both NPN transistors, they are initially turned off so that the voltage divider network establishing the bias on the base of transistor 30 consists of resistors 36, 38, and 40. However, when the decay valve driver 44 is actuated, the high voltage level at the output terminal 47 of the latter turns transistor 56 on. At the same time, the timer mechanism 48 produces a voltage at its output terminal, which continues for a predetermined time period. The output voltage from the timer 48 turns on transistor 52. Since both transistors 52 and 56 are turned on, resistor 38 is connected directly to the ground at 54, thereby effectively switching the resistor 40 out of the circuit. Therefore, the bias on the base of transistor 30 will be reduced, thereby permitting a much lower votage on the base of transistor 26 from the amplifier 22 before turning off transistor 30 to suppress the signal to the valve driver 44. This lower voltage level corresponds to the $G_2$ acceleration level on FIG. 2, and when the wheel 14 equals the $G_2$ acceleration level, the valve driver 44 turns the solenoid valve 46 off, to again permit braking pressure to build. Therefore, the solenoid valve 46 will be turned on whenever wheel deceleration exceeds the $G_1$ level and will be turned off whenever the wheel accelerates past the $G_2$ level or when the output signal from the time 48 expires and the controlled wheel accelerates past the $G_1$ level. If the deceleration exceeds the $G_1$ level the solenoid valve will remain on even after the output signal from the timer expires, since expiration of the timer output signal merely turns off transistor 52, thereby switching the bias on the base of transistor 30 back to a value corresponding to a $G_1$ deceleration level.

Operation of a vehicle equipped with an adaptive braking system over certain road surfaces may result in spurious signals to the decay valve which causes a number of decay cycles to be initiated in a very brief time period. Examples of vehicle operation which might generate these spurious signals include braking while traversing a very rough road or while driving over a railroad track. To suppress these spurious signals, and to permit only a single decay cycle within a predetermined time period, transistor 60 has been provided. Initially, the base of transistor 60 is connected to the supply line 32 and is therefore maintained at a relatively high voltage level, so that the transistor is turned off.

When the wheel 14 has decelerated past the $G_1$ level to turn on the decay valve driver 44 and the timer 48, the output signal from the timer 48 turns on transistor 52, thereby connecting the base of transistor 60 with the ground at 54. However, the transistor 60 will not turn on since the base of the latter is also connected to the output terminal 47 of the valve driver 44 which is maintained at a relatively high voltage level as long as the valve driver 44 is actuated. But if the wheel 14 accelerates past the $G_2$ level, thereby turning off the valve driver 44, the voltage at the terminal 47 will fall to ground. Since the base of transistor 60 will then be connected only to the ground at 54 and the terminal 47, transistor 60 turns on to connect transistor 30 to the ground at 66, thereby suppressing all further signals to the valve driver 44 to prevent the latter from being actuated until the output signal of the timer 48 expires. When this occurs, transistor 52 is turned off, thereby again connecting the base of transistor 60 to the supply line 32, thereby raising the bias on the latter an amount sufficient to turn off the transistor 60. Signals will again be transmitted to the valve driver 44 from the transistor 30, again permitting decay cycles if wheel deceleration falls below the $G_1$ level.

I claim:

1. In a wheeled vehicle having a brake for braking a corresponding wheel, an adaptive braking system for controlling said brake to prevent skidding of said corresponding wheel comprising:
control means for sensing an incipient skidding condition of said corresponding wheel; and
a modulator actuated by said control means for relieving braking pressure in said corresponding wheel when an incipient skidding condition is sensed;
said control means including first means for generating a first output signal proportional to acceleration and deceleration of said corresponding wheel, comparator means switchable from a first state comparing said first signal to a first reference signal and generating a second output signal as long as said first signal exceeds said first reference signal, said comparator means being switchable to a second state comparing said first output signal to a second reference signal and generating said second output signal as long as the first output signal exceeds said second reference signal, said comparator means being responsive to generation of said second output signal to switch from said first state to said second state, means responsive to said second signal for actuating said modulator, and timing means responsive to generation of said second output signal for generating a third output signal for a predetermined time period, said comparator means being responsive to the third output signal to switch to said second state, and to expiration of said third output signal to switch back to said first state.

2. The invention of claim 1:
said comparator means switching from said second state to said first state upon termination of said third output signal.

3. The invention of claim 1:
said control means including inhibit means for inhibiting actuation of said modulator by said second output signal after termination of the latter within a predetermined time period after generation of said second output signal, said inhibit means again permitting said second signal to actuate said modulator after expiration of said predetermined time period.

4. The invention of claim 3:
said predetermined time period being measured from initial generation of said second output signal.

5. The invention of claim 1:
said control means including timing means responsive to generation of said second output signal for generating a third output signal for a predetermined time period, inhibit means actuated by said third output signal for inhibiting actuation of said modulator by said second output signal after termination of the latter after actuation of said inhibit means, said inhibit means again permitting said second signal to actuate said modulator after termination of said third output signal.

6. The invention of claim 5:
said comparator means being responsive to said third output signal to switch to said second state.

7. In a wheeled vehicle having a brake for braking a corresponding wheel, an adaptive braking system for controlling said brake to prevent skidding of said corresponding wheel comprising:
control means for sensing an incipient skidding condition of said corresponding wheel; and
a modulator actuated by said control means for relieving braking pressure in said corresponding wheel when an incipient skidding condition is sensed;
said control means including first means for generating a first output signal proportional to acceleration and deceleration of said corresponding wheel, comparator means for comparing said first output signal with a corresponding reference signal and generating a second output signal when the first output signal is greater than the corresponding reference signal, said comparator means being switchable from a first state comparing said first output signal to a first reference signal representing a predetermined deceleration level, said comparator means being switchable to a second state comparing said output signal to a second reference signal representing a predetermined deceleration level less than the deceleration level represented by said first reference signal, and timer means responsive to generation of said second output signal for generating a third output signal for a predetermined time period, said comparator means being responsive to said third output signal to switch to said second state during generation of said third output signal and to expiration of said third signal to switch back to said first state, and means responsive to said second output signal for actuating said modulator, whereby actuation of said modulator is terminated when the value of said first signal becomes greater than the value of said second reference signal during generation of the third output signal but terminates when the value of said first output signal is greater than the value of said first output signal after termination of said third output signal.

8. The invention of claim 7; and
inhibit means responsive to said third output signal for inhibiting regeneration of said second signal after termination of the latter before termination of said third output signal.

9. The invention of claim 8:
said inhibit means including switch means connected between the output of said comparator means and an electrical ground, said switch means being responsive to said third output signal to connect the output of the comparator means to the electrical ground to thereby inhibit transmission of said second signal to the means responsive to the latter for actuating said modulator.

10. The invention of claim 7:
said comparator means including a voltage dividing resistive network for generating said reference signals, and switch means responsive to generation of said second and third output signals for changing said network when said comparator means is switched between the first and second states.

* * * * *